US010084326B2

(12) United States Patent
Kadirvel et al.

(10) Patent No.: US 10,084,326 B2
(45) Date of Patent: Sep. 25, 2018

(54) HIGHLY ACCURATE OVER CURRENT FAULT PROTECTION FOR BATTERY PACKS

(71) Applicant: Apple Inc., Cupertino, CA (US)

(72) Inventors: Karthik Kadirvel, San Jose, CA (US); Soundararajan Manthiri, Cupertino, CA (US)

(73) Assignee: Apple Inc., Cupertino, CA (US)

(*) Notice: Subject to any disclaimer, the term of this patent is extended or adjusted under 35 U.S.C. 154(b) by 112 days.

(21) Appl. No.: 15/167,263

(22) Filed: May 27, 2016

(65) Prior Publication Data

US 2016/0380447 A1 Dec. 29, 2016

Related U.S. Application Data

(60) Provisional application No. 62/184,154, filed on Jun. 24, 2015.

(51) Int. Cl.
*H02J 7/00* (2006.01)
*H01M 10/42* (2006.01)
*H01M 10/48* (2006.01)
*H01M 10/44* (2006.01)
*H01M 2/34* (2006.01)

(52) U.S. Cl.
CPC ............ *H02J 7/0026* (2013.01); *H01M 2/34* (2013.01); *H01M 10/425* (2013.01); *H01M 10/441* (2013.01); *H01M 10/482* (2013.01); *H02J 7/0083* (2013.01); *H01M 2010/4271* (2013.01); *H01M 2200/00* (2013.01)

(58) Field of Classification Search
CPC ...................................................... H02J 7/0026
USPC ........................................................ 320/112
See application file for complete search history.

(56) References Cited

U.S. PATENT DOCUMENTS

| | | | | |
|---|---|---|---|---|
| 5,977,751 | A * | 11/1999 | Blessing | ............... H02J 7/0029 |
| | | | | 320/134 |
| 6,239,581 | B1 | 5/2001 | Yoshida | |
| 6,600,362 | B1 | 7/2003 | Gavrila | |
| 7,068,012 | B1 | 6/2006 | Geren | |
| 7,394,635 | B2 | 7/2008 | Ikeuchi | |
| 2014/0354238 | A1* | 12/2014 | Moreno | ................. H02H 3/006 |
| | | | | 320/134 |

* cited by examiner

*Primary Examiner* — Samuel Berhanu
*Assistant Examiner* — Tessema Kebede
(74) *Attorney, Agent, or Firm* — Blank Rome LLP

(57) ABSTRACT

This disclosure relates generally to the field of providing highly accurate over current fault protection in charging systems and, more particularly, to systems in which the charge over current protection (COCP) and discharge over current protection (DOCP) circuitry in electronic devices are particularly resilient to variations in field-effect transistor (FET) resistance with temperature, gate drive, and/or process shift; variations in printed circuit board (PCB) resistance; and variations in integrated circuit (IC) trip voltages. Through the use of novel circuit designs disclosed herein that effectively "bypass" the traditional "power FETs" that control the current flow to the battery pack(s) of the electronic device using a novel "sense FET" concept, the major sources of error in current sensing may be eliminated without compromising any safety features of the electronic device, thus allowing for more accurate over current fault protection systems for battery packs across a wide range of operating conditions and temperatures.

20 Claims, 4 Drawing Sheets

HIGHLY ACCURATE OVER CURRENT FAULT PROTECTION FOR BATTERY PACKS

BACKGROUND

This disclosure relates generally to the field of providing highly accurate over current fault protection in charging systems in which power converters are used to charge electronic devices and, more particularly, to systems in which the charge over current protection (COCP) and discharge over current protection (DOCP) circuitry in electronic devices are particularly resilient to variations in temperature, printed circuit board (PCB) resistance, and integrated circuit trip voltages.

Power converter circuitry can be used to convert alternating current (AC) power into direct current (DC) power. AC power is typically supplied from wall outlets, and is sometimes referred to as line power. Electronic devices include circuitry that runs from DC power. The DC power that is created by an AC-to-DC power converter may be used to power an electronic device. The DC power that is created may also be used to charge a battery in an electronic device.

In some applications, AC-to-DC power converter circuitry may be incorporated into an electronic device. For example, desktop computers often include AC to DC power converter circuitry in the form of computer power supply units. A computer power supply unit may have a socket that receives an AC power cord. With this type of arrangement, the AC power cord may be plugged directly into the computer to supply AC power without using an external power converter.

Although desktop computers are often large enough to accommodate internal power supplies, other devices such as handheld electronic devices and portable computers may not be. As a result, typical handheld electronic devices and laptop computers require the use of external power converters. When disconnected from the power converter, a handheld electronic device or portable computer may be powered by an internal battery or batteries, such as a Li-ion (i.e., Lithium-ion) battery pack. When an AC line power is available, the power converter is used to convert AC power into DC power for the electronic device.

Compact AC-DC power converter designs are typically based on switched-mode power supply architectures. Switched-mode power converters contain switches, such as transistor-based switches (e.g., field-effect transistor, or "FETs"), that work in conjunction with energy storage components, such as inductive and capacitive elements, to regulate the production of DC power from an AC source. One or more protector integrated circuits (ICs) may be employed in the electronic device being charged that provide a feedback path that may be used to disable the charging process if unsafe charging conditions are sensed in the device being charged.

High power converter efficiency is desirable for conserving power. High power conversion efficiency can be obtained by using efficient converter topologies and low-loss parts. Even when an optimal design is used, however, certain fault conditions may arise in the electronic device that is being charged, e.g., over voltage (OV) conditions, under voltage (UV) conditions, charge over current (COC), discharge over current (DOC), and short circuit (SC) conditions. Variation in the detection of these thresholds may be caused by, e.g.: 1.) temperature/gate drive/process shift-dependent variation in the resistance of FETs being used to sense the charging current in the device being charged; 2.) variation in resistance of the PCB in the device being charged (which can affect the sensed charging current); and 3.) variation in the trip voltage of the one or more protector ICs used in the device being charged.

It would therefore be desirable to provide highly accurate current fault protection circuitry for portable electronic devices having battery packs that is able eliminate or reduce the errors associated with the various causes of fault conditions enumerated above.

SUMMARY

Described herein are various systems and devices for improved battery pack protectors with highly accurate over current fault protection systems. In an environment in which an electronic device has a battery, a power converter may be used to convert alternating-current (AC) power from a wall outlet to direct-current (DC) power to charge the battery. The electronic device may have an input-output port. The power converter may be connected to the input-output port. When connected in this way, the power converter may supply DC power at its output that is received by the electronic device. Battery charging circuitry in the electronic device may use the DC power from the power converter to charge the battery in the electronic device.

The electronic device may have "protection" circuitry or other circuitry at its input-output port that contains switching circuitry. The switching circuitry may be placed in an open circuit state whenever it is desired to protect the internal circuitry of the electronic device from out-of-range power supply voltages and/or out-of-range current levels in the electronic device. Typical Li-ion battery pack protectors have circuitry for protection against both charge over current (COCP) and discharge over current (DOCP) conditions. The COCP and DOCP "trip points" may be detected by comparing the voltage drop across a "sense element" (e.g., a FET or resistor, or combination thereof) to a predetermined threshold. The ICs used for this protection function may sense over voltage (OV) conditions, under voltage (UV) conditions, and short circuit (SC) conditions, in addition to detecting the attachment of a charger.

However, these COCP and DOCP circuits typically have had very poor accuracy (e.g., up to 3×-4× in variation in current sensed compared to true current levels). As mentioned above, the major sources of error may include: 1.) temperature/gate drive/process shift-dependent variation in the resistance of FETs being used to sense the charging current in the device being charged; 2.) variation in resistance of the PCB in the device being charged (which can affect the sensed charging current); and 3.) variation in the trip voltage of the one or more protector ICs used in the device being charged. The biggest source of error tends to come from 1.) above. Through the use of novel circuit designs disclosed herein that effectively "bypass" the traditional "power FETs" that control the current flow to the battery pack using a so-called "sense FET" concept, the sources of error from 1.) and 2.) above may be eliminated without compromising any safety features of the device, thus allowing for much more accurate over current fault protection systems for battery packs across a wide range of operating conditions and temperatures.

Further features of the invention, its nature and various advantages will be more apparent from the accompanying drawings and the following detailed description of the preferred embodiments.

DETAILED DESCRIPTION

Figure 1:
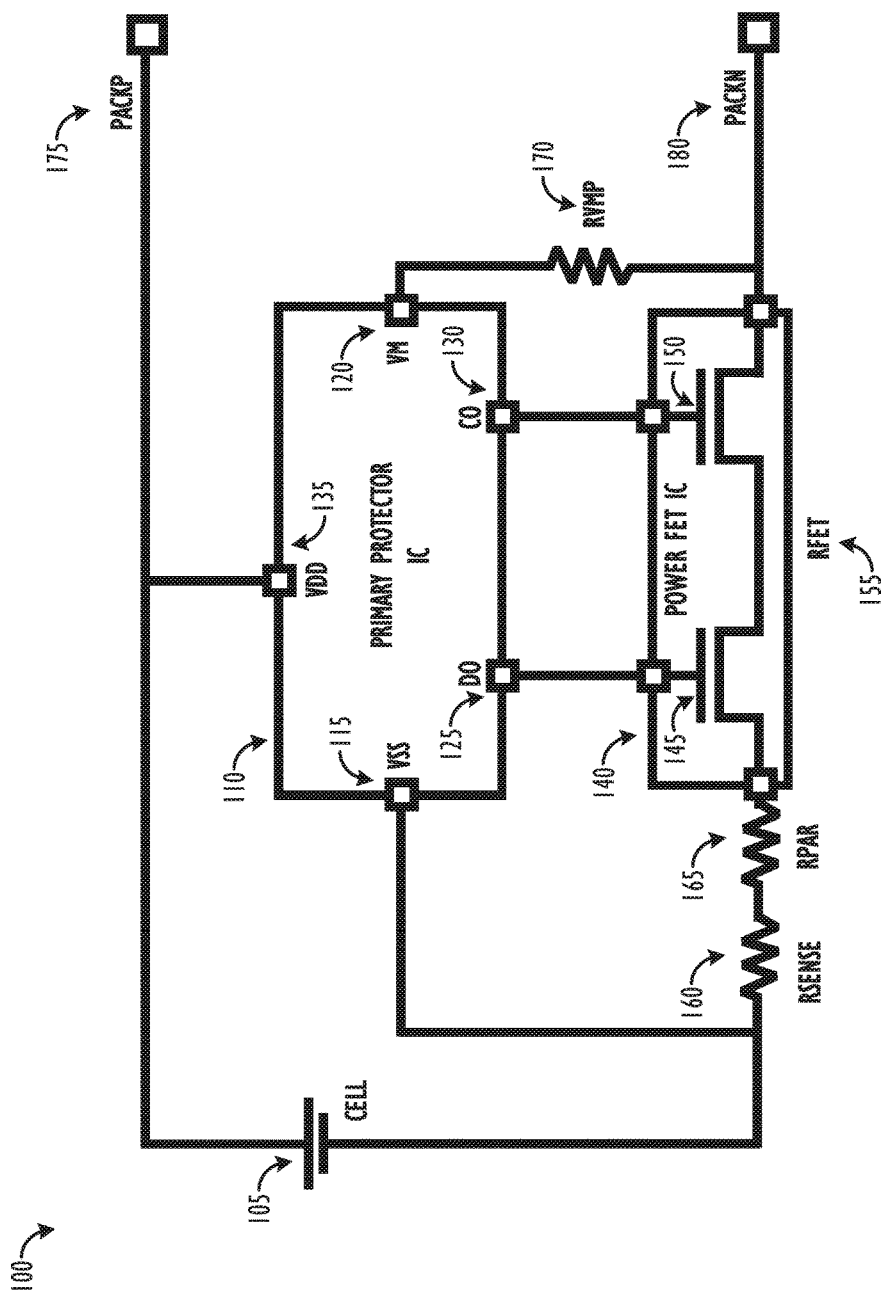
FIG. 1 illustrates a single protector design with no Sense FET IC.

Various systems and devices are disclosed herein, which provide electronic devices having battery packs with more accurate over current fault protection systems for battery packs across a wide range of operating conditions and temperatures. Power converters (sometimes referred to as power adapters) may be used to convert alternating current (AC) power into direct current (DC) power. For example, a wall charger for a portable electronic device may include an AC-to-DC power converter circuit. The wall charger represents a type of power converter. Power converters can be used for a variety of applications, but the use of power converters for charging batteries in electronic devices, such as portable electronic devices, is described in detail herein.

The electronic device being charged may typically have one or more protection circuits at its input. The protection circuit may have one or more switches (e.g., transistor-based switching circuitry). During normal operation, when a power supply voltage of an appropriate level is present on the electronic device input, the switch may be closed to allow power to flow into the electronic device. In its capacity as part of the protection circuit, the switch may be opened whenever: the input voltage drifts out of range (e.g., by falling to an unacceptable level of, say, 2.0 volts, in this example); the charging (or discharging) current through the electronic device drifts out of range; and/or a short circuit condition is detected in the electronic device.

However, such prior art protection circuits often have very poor accuracy, due to, e.g., substantial variation in FET resistance with temperature, gate drive, and process shift. In other words, if the charging/discharging current in the electronic device is determined by measuring the voltage drop across a "sense resistor" and the one or more FETs controlling the charging of the electronic device (i.e., "Power FETs"), each having assumed resistance values, such current calculations become inaccurate as the assumed resistance values of the components in the electronic device change under different load and/or operating conditions (e.g., changes in temperature, gate voltage, etc.).

Thus, described herein are improved designs for portable electronic device battery charger protector ICs that employ a novel "Sense FET" concept. In such designs, the measurement node of the protector IC (VM) may be connected to a "sense resistor" directly through a "Sense FET," as opposed to through the "Power FETs" (i.e., the FETs that control the flow of current to the battery pack of the electronic device). The "Sense FET" is a new concept that allows the measurement node (VM) of the protector IC to sense the resistor voltage comprising any current safety feature (e.g., charge over current, discharge over current, short circuit, etc.), as well as perform charger attach detection, using a so-called "protected sense line."

The improved circuits disclosed herein are applicable to any number of electronic devices that are supplied power from isolated systems, such as: digital cameras, mobile phones, watches, personal data assistants (PDAs), portable music players, monitors, as well as desktop, laptop, and tablet computers.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

Referring now to FIG. 1, a single protector design 100 with no SENSE FET IC is shown. Battery CELL 105 represent the power source of the battery pack of the electronic device. PRIMARY PROTECTOR IC 110 comprises several measurement pins: VSS (115); Vm (120); DO, i.e., Discharge Output (125); CO, i.e., Charge Output (130), and VDD (135). The battery pack of the electronic device is represented by the two nodes: PACKP, i.e., positive battery pack node (175), and PACKN, i.e., positive battery pack node (180). Circuit design 100 further comprises POWER FET IC 140, comprising exemplary FET switches 145 and 150. As may be seen, the DO and CO pins of the PRIMARY PROTECTOR IC 110 may be used to control the opening and closing of the Power FET IC switches when various operating conditions are sensed in the electronic device. The overall resistance presented by the POWER FET IC 140 is modeled as RFET 155. Also present in circuit design 100 are sense resistor, RSESNSE 160, (whose function will be described in further detail below), RPAR 165 (representing the parasitic resistance of the printed circuit board of the electronic device), and RVMP 170 (which is not essential to the circuit design, but may be present in some designs as an implementational detail choice).

PRIMARY PROTECTOR IC 110 operates by monitoring the voltage between the VSS (115) and VM (120) pins. The resistance of the various elements in the circuit (RSENSE, RPAR, and RFET) are "known" quantities within the circuit, and, thus, if the voltage between the VSS (115) and VM (120) pins is measured, dividing that voltage by the summed resistance of (RSENSE+RPAR+RFET) will result a calculation of the estimated charging/discharging current flowing through the electronic device.

If the estimated current goes above a certain limit (in either charge or discharge mode), PRIMARY PROTECTOR 110 may then act to open the necessary FETs (145/150) of POWER FET IC 140, in order to indicate a fault condition and prevent further current flow through the electronic device. As mentioned above, in actual operation, the values of RFET and RPAR vary widely across varying temperature and gate drive values, and, thus, the Primary Protector IC's estimated value for the current flowing through the charger may often be incorrect by factors of as much as 3× to 4×. As may now be more fully understood, the inability to accurately estimate over current conditions in a timely fashion (and across varying load/operating conditions) may lead to damage to the electronic device, e.g., in the event where the charging circuitry is not opened in time to prevent a fault or short circuit condition.

It should be noted that back-to-back diodes (not shown in FIG. 1 for convenience) may be used in FETs 145/150, in order to allow current to pass in both directions (i.e., charging and discharging modes) through the POWER FET IC 140. As mentioned above, resistor RVMP 170 is an implementation detail choice, and may be present in some embodiments, e.g., to limit the amount of current flow if a user accidentally applies a charger in reverse orientation.

Figure 2:
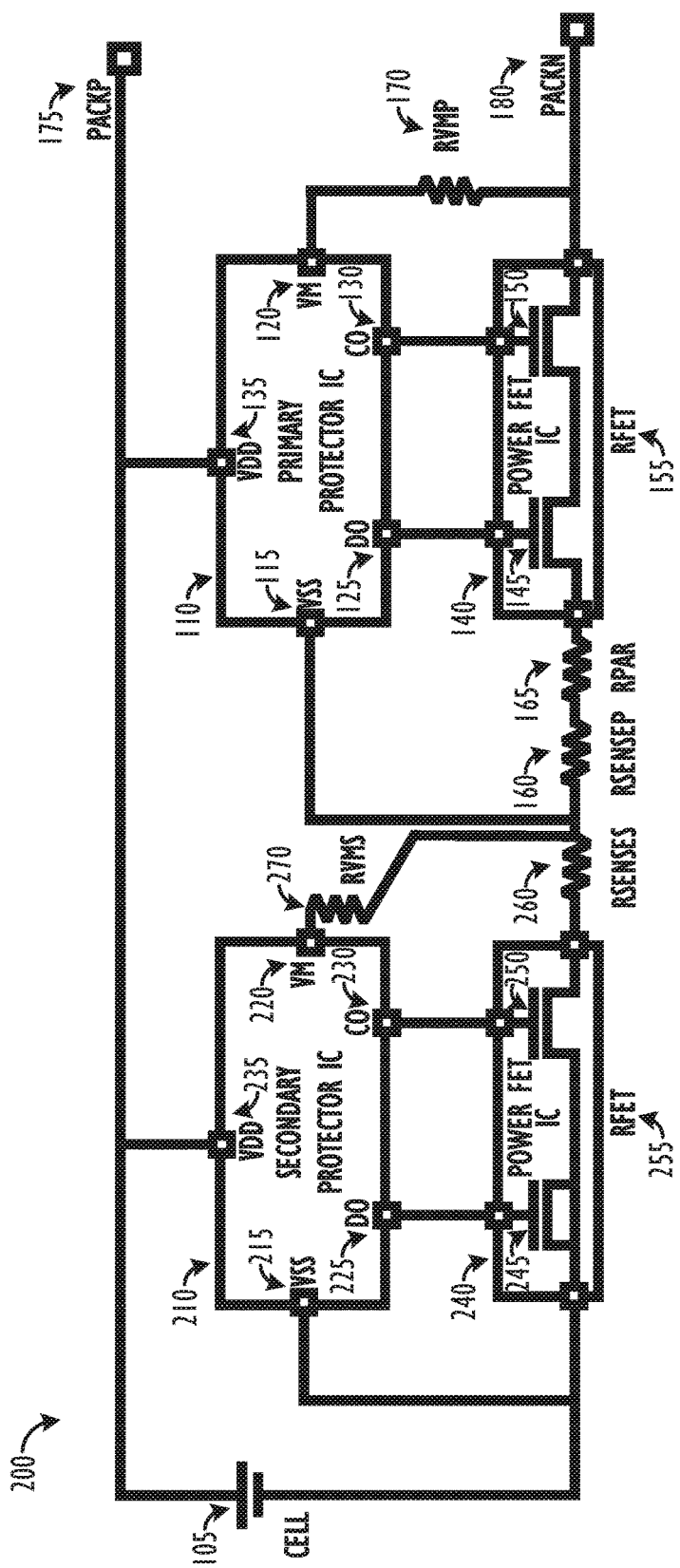
FIG. 2 illustrates a double protector design with no Sense FET ICs.

Referring now to FIG. 2, a double protector design 200 with no Sense FET ICs is shown. In general, elements numbered 1xx in FIG. 2 refer to the correspondingly-numbered element described above in reference to FIG. 1. Situations where a secondary Protector IC may be needed include devices where a separate "Temperature Cutoff Device" (TCO) is needed, e.g., in multi-cell devices with dedicated temperature-sensing elements used to stop battery cell charging in the event of device overheating.

Thus, in addition to the elements described above with reference to FIG. 1, circuit design 200 of FIG. 2 further comprises: SECONDARY PROTECTOR IC 210, which comprises several measurement pins: VSS (215); VM (220); DO, i.e., Discharge Output (225); CO, i.e., Charge Output (230), and VDD (235). Circuit design 200 further comprises SECONDARY POWER FET IC 240, comprising exemplary FET switches 245 and 250. As may be seen, the DO and CO pins of the SECONDARY PROTECTOR IC 210 may be used to control the opening and closing of the SECONDARY POWER FET IC switches when various operating conditions are sensed in the electronic device. The overall resistance presented by the SECONDARY POWER FET IC 240 is modeled as RFET 255. Also present in circuit design 200 are primary sense resistor, RSESNSEP 160, secondary sense resistor, RSESNSES 260, and RVMS 270 (which may be optionally included in the circuit for the same reasons discussed above with respect to RVMP 170 in FIG. 1).

The two-Protector IC circuit design 200 operates analogously to the one-Protector IC circuit design 100 shown in FIG. 1. As shown in FIG. 2, the primary sense resistor, RSENSEP 160, is connected between the VSS (115) pin of the PRIMARY PROTECTOR IC 110 and the PRIMARY POWER FET 140. The secondary sense resistor, RSENSES 260, is connected between the VM (220) pin and the SECONDARY POWER FET 240. The SECONDARY PROTECTOR IC 210 operates by monitoring the voltage between its VSS (215) and VM (220) pins. The resistance of the various elements in the circuit (RSENSEP, RSENSES, RPAR, and RFET) are "known" quantities within the circuit, and, thus, if the internal voltages of the PRIMARY PROTECTOR IC 110 and SECONDARY PROTECTOR IC 210 are measured, charging/discharing current flowing through the electronic device may be estimated. While the SENSE resistors (160/260) may have good resistance consistency (e.g., approximately 1% variation) across temperature ranges, the POWER FET ICs (140/240) have very poor resistance consistency across temperature and gate drive variation. That is, when the voltage on the gate of a FET varies, the resistance of the FET varies. Thus, accurate current estimation in circuit 200 is further complicated by the measurement across both the Primary and SECONDARY POWER FET ICs (140/240).

Figure 3:
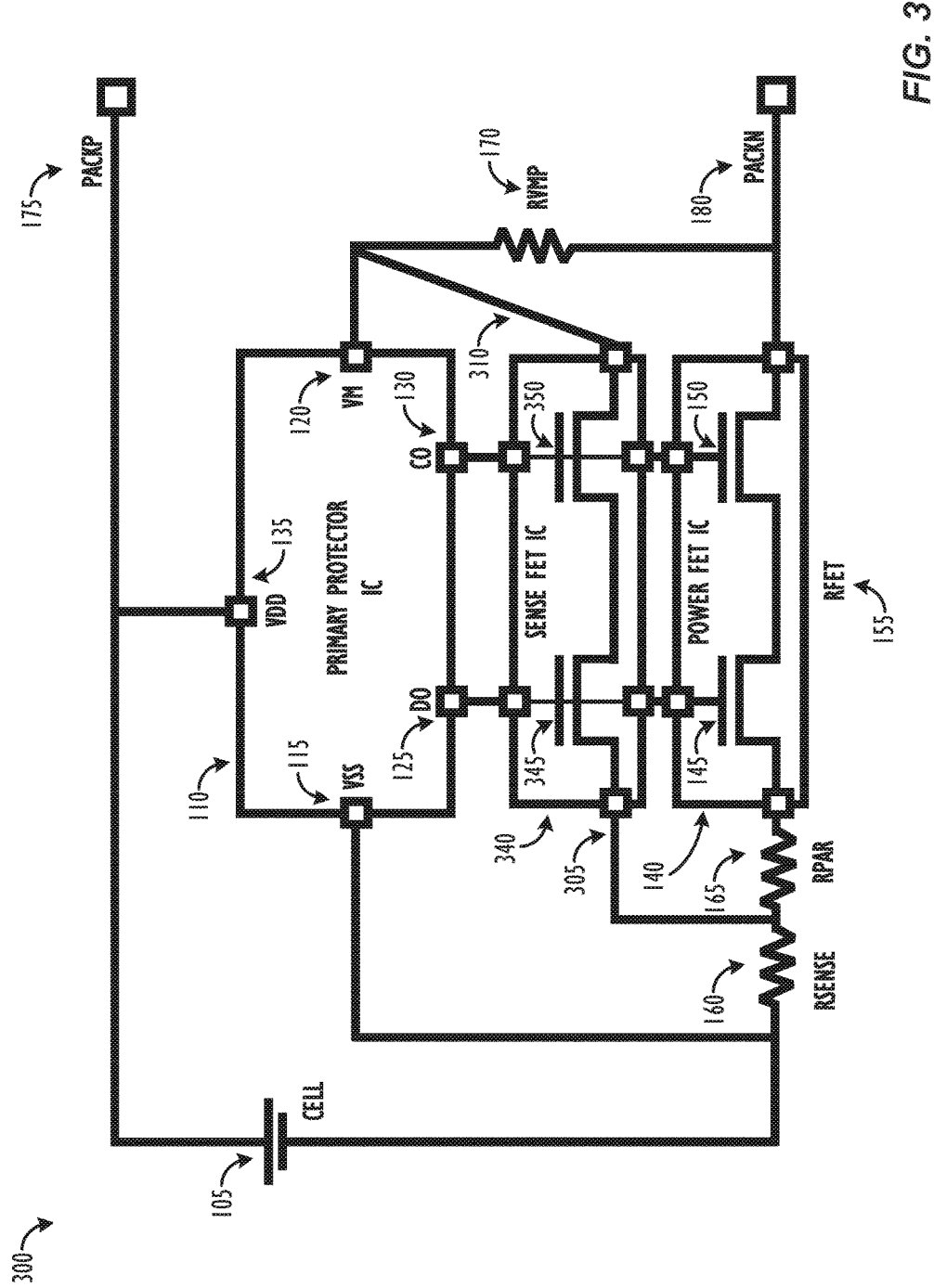
FIG. 3 illustrates a single protector design with a Sense FET IC, according to one or more embodiments.

Referring now to FIG. 3, a single protector design 300 with a Sense FET IC is shown, according to one or more embodiments. In general, elements numbered 1xx in FIG. 3 refer to the correspondingly-numbered element described above in reference to FIG. 1. In addition to the elements described above with reference to FIG. 1, circuit design 300 of FIG. 3 further comprises: SENSE FET IC (340) comprising sense FETs 345 and 350. As shown in FIG. 3, one side of the SENSE FET IC 340 is connected, via wire 305, to the right hand side of sense resistor, RSENSE 160, while the other side of the SENSE FET IC 340 is connected, via wire 310, to the VM (120) pin of the PRIMARY PROTECTOR IC 110. As is also shown in FIG. 3, Sense FET IC 340 and POWER FET IC 140 are driven by same signals, i.e., DO (125) and CO (130). In normal operation, both SENSE FETs (345/350) and both POWER FETs (145/150) are turned "on," and they allow the battery pack to charge and discharge according to normal behavior.

This new configuration—and the novel use and placement of the SENSE FET IC 340—results in a circuit configuration wherein, when the Sense FETs and Power FETs are both on, the VM (120) pin sees only the voltage across the sense resistor, RSENSE 160, and not across the sense resistor and Power FET IC combination (as would be the case with circuit 100 of FIG. 1). To put it another way, in the design of circuit 100 of FIG. 1, the PRIMARY PROTECTOR IC 110 was measuring the voltage across the VSS (115) pin and the PACKN node (180). In the design of circuit 300 of FIG. 3, by contrast, the PRIMARY PROTECTOR IC 110 is looking only across the sense resistor, RSENSE 160, because the VM (120) pin node is now connected to the sense resistor, RSENSE 160, through the new Sense FET IC 340 and wire 305. As mentioned above, when the highly variable resistance of the POWER FET IC 140 is taken out of the measurement path, much more accurate estimates of the current value may be obtained across a range of load/operating conditions. Typical Power FET resistance values may be in the range of a few milliohms. The Sense FETs are not carrying current, so they can be a much higher resistance value. The design of circuit 300 of FIG. 3 also eliminates the PCB resistance, represented by RPAR 165 from the current estimation calculation, thus eliminating another source of potential error in the current estimation process.

Figure 4:
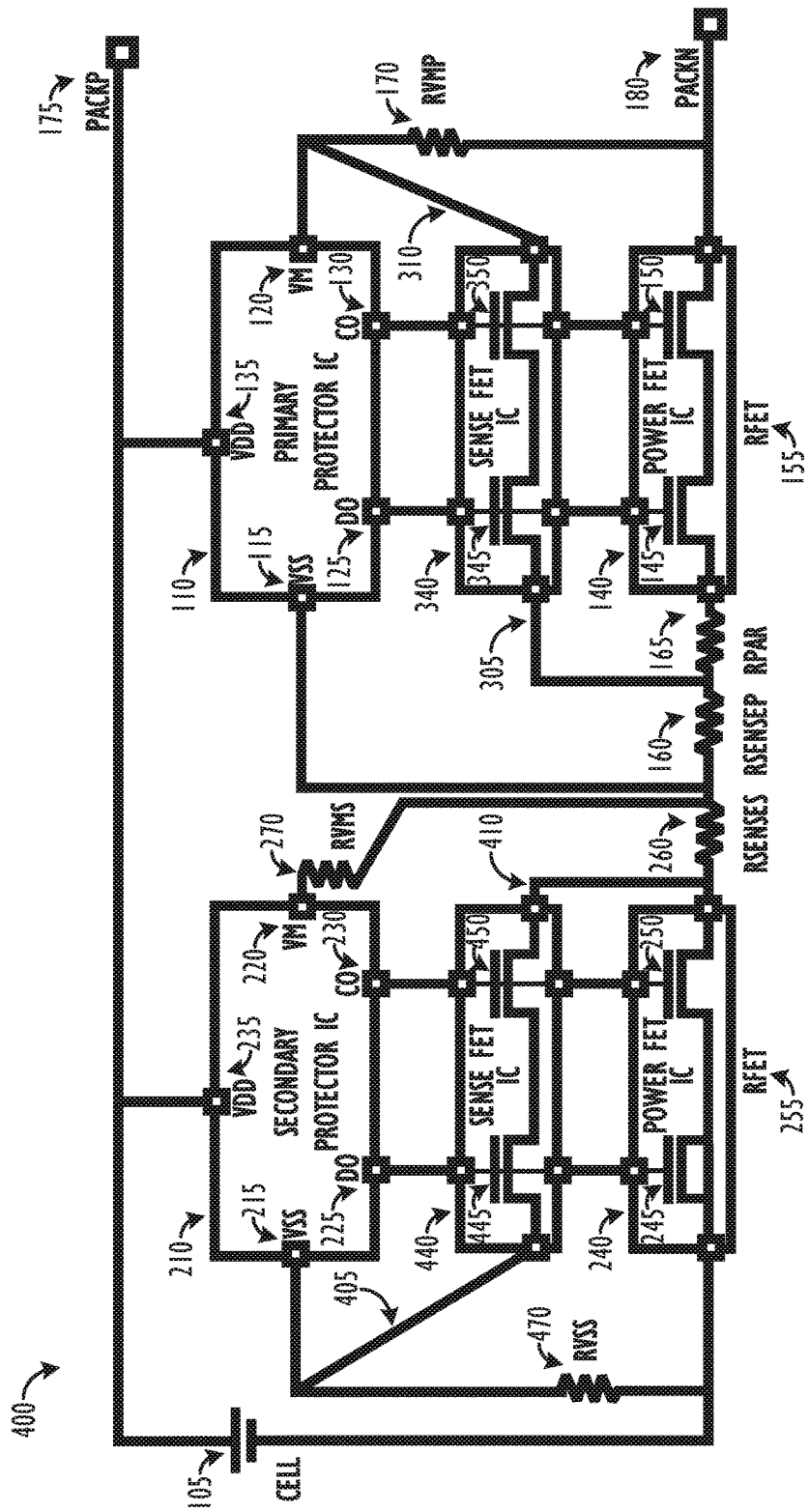
FIG. 4 illustrates a double protector design with two Sense FET ICs, according to one or more embodiments.

Referring now to FIG. 4, a double protector design 400 with two Sense FET ICs is shown, according to one or more embodiments. In general, elements numbered 1xx, 2xx, and 3xx in FIG. 4 refer to the correspondingly-numbered element described above in reference to FIG. 1, FIG. 2, and FIG. 3, respectively. In addition to the elements described above with reference to FIGS. 1 through 3, circuit design 400 of FIG. 4 further comprises: SECONDARY SENSE FET IC (440) comprising sense FETs 445 and 450.

As shown in FIG. 4, one side of the SECONDARY SENSE FET IC 440 is connected, via wire 410, to the left hand side of secondary sense resistor, RSENSE 260, while the other side of the SENSE FET IC 440 is connected, via wire 405, to the VSS (215) pin of the SECONDARY PROTECTOR IC 210. As is also shown in FIG. 4, SENSE FET IC 440 and POWER FET IC 240 are driven by same signals, i.e., DO (225) and CO (230). In normal operation, both SENSE FETs (445/450) and both POWER FETs (245/250) are turned "on," and they allow the battery pack to charge and discharge according to normal behavior.

This new configuration—and the novel use and placement of the SECONDARY SENSE FET IC 440—results in a circuit configuration wherein, when the Sense FETs and Power FETs are both on, the VSS (215) pin sees only the voltage across the secondary sense resistor, RSENSES 260, and the primary sense resistor, RSENSEP 160, and not across the combination of the sense resistors and the Power FET ICs (140/240), as would be the case with circuit 200 of FIG. 2.

In the design of circuit 200 of FIG. 2, the VSS (215) pin of the SECONDARY PROTECTOR IC 210 was connected directly to the negative terminal of the cell 105. In the design of circuit 400 of FIG. 4, by contrast, the Vss (215) pin of the SECONDARY PROTECTOR IC 210 is connected to the left hand side of the secondary sense resistor, RSENSES 260. As will be explained below, if not for the presence of resistor RVSS 470, the circuit design would not work properly. More particularly, RVSS 470 serves to intentionally debias the VSS (215) pin (with negligible effect on error, due to the fact that RVSS may be on the order of 100 Ohms, in some embodiments) so that the SECONDARY PROTECTOR IC 210 actually functions as intended. RVSS 470, therefore, effectively mimics the functionality of resistor RVMP 170 on the primary side. In other words, the presence of RVSS 470 prevents VSS (215) pin from looking at the negative side of CELL 105. If VSS (215) pin were to look at the negative side of cell 105, then the effect of POWER FET IC 240 would also come into play, thus defeating the beneficial "bypass" functionality of the SENSE FET IC 440 in reducing the impact of the variability of the resistance of the POWER FET IC 240 in the accurate estimation of charging/discharging current flowing through the electronic device. The design of circuit 400 of FIG. 4 also eliminates the PCB resistance, represented by RPAR 165 from the current estimation calculation, thus eliminating another source of potential error in the current estimation process.

Typical prior art systems have to account for the inaccuracies in current estimation, e.g., due to the potential sources of error discussed above, by building in additional margins to their charging protection circuitry, e.g., cutting off charging sooner than is really necessary, in order to mitigate the risk of an over current fault condition arising from an inaccurately measured current flow. Because the improved battery pack over current fault protection circuits disclosed herein are able to provide a much more accurate estimate of current, the margins in such devices may be tightened up, resulting in a more efficient overall charging process.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

What is claimed is:
1. A battery pack comprising:
at least one cell;
a first protector circuit coupled to the at least one cell and configured to monitor a battery pack current;
a first power field-effect transistor (FET) circuit, coupled to and controlled by the first protector circuit and further coupled to the at least one cell, operable to disconnect the at least one cell, thereby interrupting the battery pack current, responsive to an overcurrent condition of the battery pack current; and
a first sense FET circuit, coupled to the first protector circuit and the first power FET circuit, so as to enable the first protector circuit to sense the battery pack current, thereby reducing current measurement errors caused by the first power FET circuit,
wherein the first sense FET circuit is connected in a first direction to a first input of the first protector circuit via a first sense resistor.
2. The battery pack of claim 1, further comprising:
a second protector circuit comprising two or more inputs connected to the at least one cell to regulate the battery pack current;
a second power FET circuit, coupled to the second protector circuit and controlled by the second protector circuit, and further coupled to the at least one cell, so as to control the battery pack current;
a second sense FET circuit, coupled to the second protector circuit and the second power FET circuit, so as to allow the second protector circuit to sense the battery pack, thereby reducing current measurement errors caused by the second power FET circuit,
wherein the second sense FET circuit is connected in a second direction to a first input of the second protector circuit via a second sense resistor; and
a third resistor connected between a second input of the second protector circuit and the at least one cell.
3. The battery pack of claim 1, wherein the first sense FET circuit is connected in a third direction to a second input of the first protector circuit.
4. The battery pack of claim 2, wherein the second sense FET circuit is connected in a fourth direction to a second input of the first protector circuit.
5. The battery pack of claim 3, wherein the first sense FET circuit is further connected in the third direction to the second input of the first protector circuit via a fourth resistor.
6. The battery pack of claim 4, wherein the second sense FET circuit is further connected in the fourth direction to the second input ,of the first protector circuit via a fifth resistor.
7. The battery pack of claim 1, wherein the first power FET circuit and the first sense FET circuit are controlled by one or more of the same signals from the first protector circuit.
8. The battery pack of claim 2, wherein the second power FET circuit and the second sense FET circuit are controlled by one or more of the same signals from the second protector circuit.
9. The battery pack of claim 1, wherein the current measurement errors caused by the first power FET circuit comprise one or more of the following: variations in FET resistance with temperature, gate drive, or process shift; variations in printed circuit board (PCB) resistance; and variation in integrated circuit trip voltage.
10. The battery pack of claim 2, wherein the current measurement errors caused by the second power FET circuit comprise one or more of the following: variations in FET resistance with temperature, gate drive, or process shift; variations in printed circuit board (PCB) resistance; and variation in integrated circuit trip voltage.
11. The battery pack of claim 2, wherein the third resistor serves to intentionally debias the second input of the second protector circuit.
12. The battery pack of claim 1, wherein the first protector circuit controls the first power FET circuit by turning off the first power FET circuit if: a sensed battery pack current is over a predetermined threshold value; a short circuit condition is detected; or a detatched charger state is detected.
13. The battery pack of claim 2, wherein the second protector circuit controls the second power FET circuit by turning off the second power FET circuit if: a sensed battery pack current is over a predetermined threshold value; a short circuit condition is detected; or a detatched charger state is detected.

14. The battery pack of claim 2, wherein the second protector circuit comprises a Temperature Cutoff Device.

15. A method of charging a battery pack using one or more cells, the method comprising:
    connecting a first protector circuit having two or more inputs to the one or more cells;
    monitoring, by the first protector circuit, a battery pack current;
    controlling, by the first protector circuit, a first power field-effect transistor (FET) circuit coupled to the first protector circuit and the one or more cells, so as to disconnect the one or more cells, responsive to an overcurrent condition of the battery pack current; and
    sensing, by a first sense FET circuit coupled to the first protector circuit and the first power FET circuit, the battery pack current, thereby reducing current measurement errors caused by the first power FET circuit,
    wherein the first sense FET circuit is connected in a first direction to a first input of the first protector circuit via a first sense resistor.

16. The method of claim 15, further comprising:
    monitoring, by a second protector circuit comprising two or more inputs connected to the one or more cells, a battery pack current;
    controlling, by the second protector circuit, a second power FET circuit coupled to the second protector circuit and the one or more cells, so as to disconnect the one or more cells, responsive to an overcurrent condition of the battery pack current; and
    sensing, by a second sense FET circuit coupled to the second protector circuit and the second power FET circuit, the battery pack current, thereby reducing current measurement errors caused by the second power FET circuit,
    wherein the second sense FET circuit is connected in a second direction to a first input of the second protector circuit via a second sense resistor, and
    wherein a third resistor is connected between a second input of the second protector circuit and the one or more cells.

17. The method of claim 15, wherein the first sense FET circuit is connected in a third direction to a second input of the first protector circuit.

18. The method of claim 16, wherein the second sense FET circuit is connected in a fourth direction to a second input of the first protector circuit.

19. The method of claim 16, wherein the current measurement errors caused by either the first power FET circuit or the second power FET circuit comprise one or more of the following: variations in FET resistance with temperature, gate drive, or process shift; variations in printed circuit board (PCB) resistance; and variation in integrated circuit trip voltage.

20. A battery pack comprising:
    one or more cells;
    a first protector circuit comprising two or more inputs connected to the one or more cells to monitor battery pack current;
    a first power field-effect transistor (FET) circuit, coupled to and controlled by the first protector circuit and further coupled to the one or more cells, so as to disconnect the battery pack, thereby interrupting the battery pack current, responsive to an overcurrent condition of the battery pack current;
    a first sense FET circuit, coupled to the first protector circuit and the first power FET circuit, so as to allow the first protector circuit to sense the battery pack current, thereby reducing current measurement errors caused by the first power FET circuit;
    a second protector circuit comprising two or more inputs connected to the one or more cells and configured to determine at least a charging current for the battery pack and a discharging current for the battery pack;
    a second power FET circuit, coupled to the second protector circuit and controlled by the second protector circuit, and further coupled to the plurality of cells, so as to control the at least charging current and the at least discharging current for the battery pack; and
    a second sense FET circuit, coupled to the second protector circuit and the second power FET circuit, so as to allow the second protector circuit to sense at least a charging current and a discharging current for the battery pack, while eliminating current measurement errors caused by the second power FET circuit,
    wherein the second sense FET circuit is connected in a first direction to a first input of the second protector circuit via a first sense resistor, and
    wherein a second resistor is connected between a second input of the second protector circuit and the one or more cells.

* * * * *